March 28, 1967   J. W. BECK   3,311,842
DIGITAL TRANSDUCER WITH CONDITION RESPONSIVE
SHOCK EXCITED RESONANT CIRCUIT
Filed Jan. 19, 1965
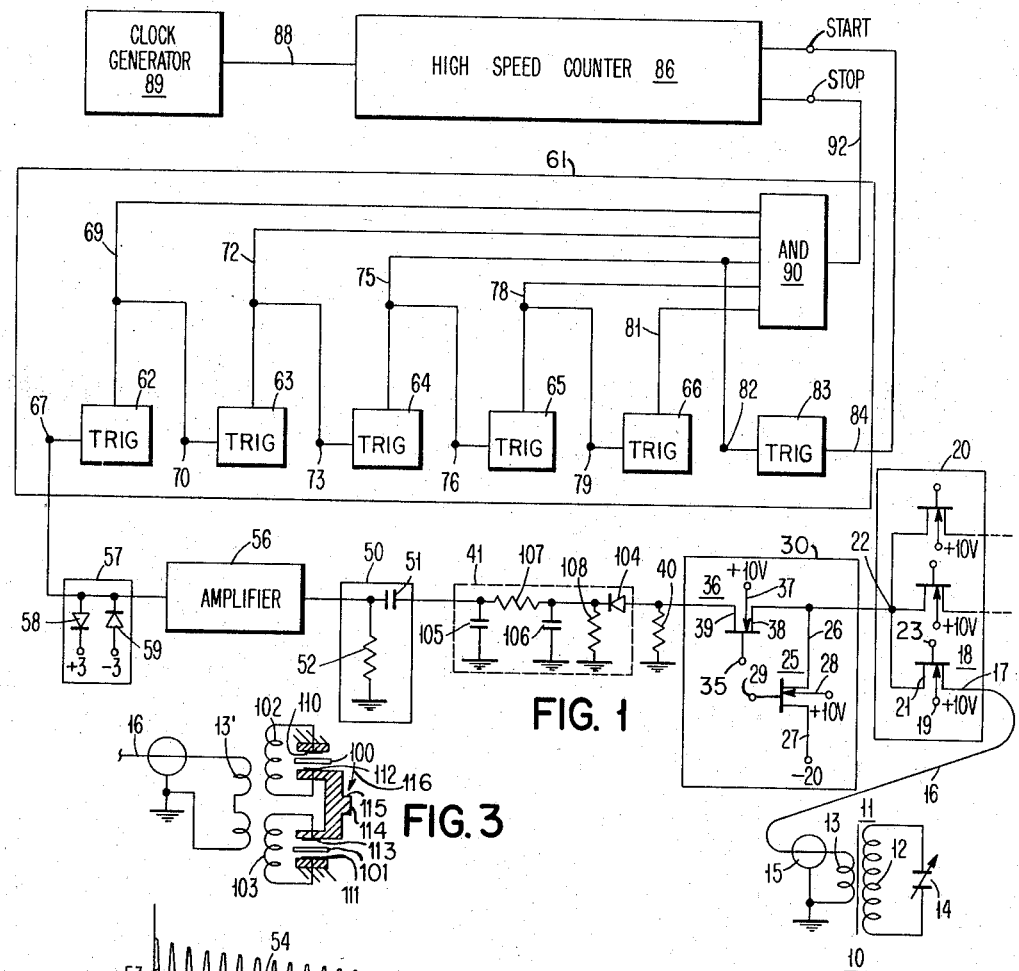
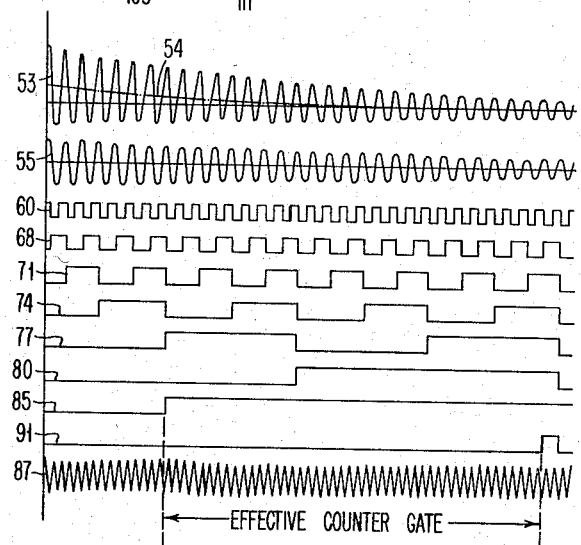
INVENTOR.
JOHN W. BECK
ATTORNEY

United States Patent Office 3,311,842
Patented Mar. 28, 1967

3,311,842
DIGITAL TRANSDUCER WITH CONDITION RESPONSIVE SHOCK EXCITED RESONANT CIRCUIT
John W. Beck, San Jose, Calif., assignor to International Business Machines Corporation, Armonk, N.Y., a corporation of New York
Filed Jan. 19, 1965, Ser. No. 426,505
14 Claims. (Cl. 331—66)

This invention relates to the measurement of a physical variable, and particularly to a transducer for developing a signal having a frequency proportional to the value of the variable.

Transducers which convert an analog variable into a frequency modulated oscillator signal are able to convey information in digital form which is insensitive to amplitude variations. This is a very desirable characteristic since many process control systems involve the transmission of such signals over relatively long distances. A frequency modulated signal is often acceptable for computer use without resorting to special conversion hardware. Additionally, the problem of noise interference is greatly reduced with this type of signal. Despite these and other advantages the application of such transducers has been inhibited by the inconvenience and expense of the oscillator circuit required for each sensor and the attendant power supply. While these transducers provide a convenient, 2-wire output signal which may be transmitted over long distances without loss of accuracy additional wires are usually required to convey power to the transducer oscillator, thereby increasing the complexity and cost of the installation.

It is, therefore, an object of my invention to provide an improved 2-wire digital transducer.

It is another object of my invention to provide a digital transducer which obviates the need for an associated oscillator circuit.

Still another object of my invention is to provide a digital transducer having a shock excited resonant circuit.

The foregoing and other objects, features and advantages of the invention will be apparent from the following more particular description of preferred embodiments of the invention as illustrated in the accompanying drawings.

FIG. 1 is a schematic diagram of a system embodying the invention.

FIG. 2 represents the signal waveforms at various points in the circuit.

FIG. 3 is an alternate form of transducer.

The system of this invention uses a transducer circuit having a resonant frequency dependent on the variable to be measured in a manner similar to exciting devices. For example, a temperature sensitive capacitor may be used in an LC resonant circuit to provide a shift in frequency as a function of temperature. Alternatively, a pressure sensing diaphragm may be mechanically coupled to a ferromagnetic or other device to vary inductance as a function of pressure. In still another form, a diaphragm may be used oppositely to stress a pair of quartz crystals thereby shifting the points of resonance to provide a low frequency heterodyne signal.

While prior art devices utilize the resonant circuit to control the frequency of an oscillator, this invention provides for simple shock excited oscillations in the resonant circuit. The shock excited oscillations are integrated to eliminate any D.C. component, then amplified and clipped to provide a square wave signal to an interval counter. The interval counter provides start and stop signals at the beginning and end, respectively, of the interval including, say 23 cycles of the shock excited oscillations. The start and stop signals control operation of a high speed counter which accumulates a count proportional to the period of the shock excited oscillations and inversely proportional to the frequency of the oscillations.

In the embodiment of FIG. 1 the transducer 10 includes an LC resonant circuit having an inductor 11 with primary and secondary windings 12 and 13, respectively, and capacitor 14. Either the capacitor or inductor may be made responsive to the measured element variable in a manner known to the art. For the purpose of this description, it will be assumed that capacitor 14 is a temperature sensitive element having a nominal value of 97 pf. The primary winding 12 has an inductance of 5.3 mh., and secondary winding has an inductance of .53 μh. A ferromagnetic slug is positioned between the two coils to provide a coefficient of coupling $k=0.19$. The resulting Q, with a 93 ohm load across winding 13, is 63.

One end of winding 13 is connected to ground, which may be the shield of coaxial cable 15. The other end of winding 13 is connected to the inner conductor 16 of coaxial cable 15 which has a characteristic impedance of 93 ohms. Cable 15 may be one of many inputs to multiplexer 20. Other inputs may come from similar transducers associated with other variables. The particular form of multiplexer 20 will vary according to the system configuration.

In one form, multiplexer 20 utilizes FI 100 field effect transistors manufactured by Fairchild Semiconductors. The conductor 16 leads to the source electrode 17 of a P channel field effect transistor 18. A substrate connection 19 is returned to a +10 volt source. When a negative gate signal is applied to gate electrode terminal 23 the impedance between drain electrode 21 and source electrode 17 is reduced to a low level to connect the selected transducer to common line 22.

Also connected to common line 22 is pulse generator 30 shown as a P channel field effect transistor 25 which may also be an FI 100. Source electrode 26 is connected to line 22. Drain electrode 27 is energized by a —20 source. The substrate connection 28 is returned to a +10 volt source. After the appropriate transistor in multiplexer 20 has been selected by a negative signal on the gate electrode, a negative gate signal is applied to gate electrode terminal 29. This allows the —20 volt source to supply energy through transistors 25 and 18 to the winding 13. The resulting current in winding 13 establishes a magnetic field which is coupled to winding 12. This current is maintained for a time equal to the length of the gate pulse applied to terminal 29. For the maximum amplitude of induced oscillations, the gate pulse should be an integral number of odd half cycles of the nominal resonant frequency of winding 12 and capacitor 14.

The gate pulse at terminal 29 is then removed. At the same time a negative gate pulse is applied to the gate electrode terminal 35 of field effect transistor 36. As in the case of the transistors 18 and 25, transistor 36 is a P channel type having the substrate connection 37 returned to a +10 volt source. When the negative signal is applied to terminal 35, the resulting low impedance path between source 38 and drain 39 terminates conductor 16 in resistor 40 having a 93 ohm resistance to properly terminate coaxial cable 15.

The collapse of the magnetic field about winding 13 serves to shock excite oscillations in the LC resonant circuit of winding 12 and capacitor 14. The mutual coupling between winding 12 and winding 13 extracts a small portion of the energy from this circuit. Transistors 18 and 36, due to their low impedance condition between source and drain electrodes, convey the signal to terminating resistor 40.

The low pass filter 41 and diode 104, shown in dotted lines, are not included in this embodiment. Integrator 50 includes a capacitor 51 and resistor 52 which serve to remove any D.C. component on the signal caused by the collapse of the magnetic field associated with winding 13. This D.C. component is shown in signal waveform 53 of FIG. 2 which, while not to scale, shows the waveform at the input to integrator 50. The signal 53 is symmetrical about the exponential curve 54 which gradually approaches zero or other reference voltage.

The output of integrator 50 is shown in FIG. 2 as waveform 55, again not to scale. The D.C. component has been removed and the signal is symmetrical when fed to amplifier 56. The phase shift caused by integrator 50 has been omitted in the drawing.

The action on the output signal from amplifier 56 by clipper 57 having oppositely polarized diodes 58 and 59, is shown in FIG. 2. The sinusoidal input 55 is changed to a square wave 60 having the same frequency. It will be recognized that the squareness is a function of the sine wave amplitude. It is, therefore, necessary for amplifier 56 to develop a sine wave output having an amplitude many times greater than the required amplitude of square wave 60 on the conductor leading to input terminal 67.

The interval timer 61 operates as a control means for counter 86 and includes triggers 62, 63, 64, 65 and 66 connected to provide a binary counter. These triggers have two stable states. The output line polarity goes from minus to plus when the input line goes from plus to minus. The square wave 60 on the conductor leading to input terminal 67 of trigger 62 provides an output signal 68 on output line 69. Input terminal 70 of trigger 63 is energized with signal 68 to provide output signal 71 on output line 72. Input terminal 73 of trigger 64 is energized with signal 71 to provide output signal 74 on output line 75. Input terminal 76 of trigger 65 is energized with signal 74 to provide output signal 77 on output line 78. Input terminal 79 of trigger 66 is energized with signal 77 to provide output signal 80 on output line 81.

The output line 75 of trigger 64 is connected to input terminal 82 of trigger 83. Output line 84 provides a start signal 85 to counter 86 when trigger 64 turns off at the end of seven cycles of oscillation in winding 12. Trigger 83 remains on during the entire conversion sequence until reset by means not shown.

When the start signal 85 is applied over line 84 to the start control terminal, counter 86 begins to count the high frequency signal 87 on line 88 from clock pulse generator 89 connected to the input terminal of counter 86. This operation continues until the thirty-first cycle of oscillation in transducer 10 at which time signals 68, 71, 74, 77 and 80 are all high to condition AND gate 90 and generate a stop signal 91 on line 92 to the stop control terminal of counter 86. Thus, high speed counter 86 operates in the interval beginning with the eighth cycle of shock induced oscillation and terminating with the thirty-first. This counting interval is shown in FIG. 2 as a 23 cycle effective countergate.

In the described embodiment of this system the nominal frequency of the resonant circuit was 226 kc. The pulse generator 89 was set to provide a high frequency signal 87 of 48 mc., substantially higher than the transducer resonant frequency. At room temperature the resonant frequency was 226 kc. and the count value was $$\frac{48 \times 10^6 \text{ c.p.s.}}{226 \times 10^3 \text{ c.p.s.}} \times 23 = 4880$$

The change in capacity over a 200° F. range was 40 pf., resulting in a change of approximately 3.8 counts/° F. Assuming a ±1 count uncertainty, this gives a best case resolution of ±1/4° F.

A second embodiment utilizes the transducer of FIG. 3. A pair of quartz crystals 100 and 101 are connected across primary windings 102 and 103, respectively, which serve to provide a broad resonance at the nominal crystal frequencies to eliminate spurious responses. Secondary winding 13' is inductively coupled to primary windings 102 and 103, and performs the same function as in the case of winding 13 in transducer 10.

In the event that temperature is the variable to be measured, crystal 100 may be a cut having high sensitivity to temperature. A Y cut is satisfactory. Crystal 101 is an AT cut having low sensitivity to temperature. The difference between the resonant frequencies of crystal 100 and crystal 101 will then be a function of temperature. By combining the two high frequency signals, representing the crystal resonant frequencies, in a nonlinear device such as diode 104, detection occurs and a low frequency signal is obtained representing the frequency difference.

The fundamental crystal frequencies are eliminated in low pass filter 41 having capacitors 105, 106 and resistor 107. Resistor 108 provides a D.C. return for diode 104. The resulting signal to the integrator is in the audio range and may be processed in the same manner as that obtained from transducer 10. However, since the frequency of this signal is much lower than that of transducer 10, satisfactory operation may be obtained by operating counter 86 for a fewer number of cycles. The interval counter may be set to operate counter 86 for a single square wave cycle on line 61 where this affords sufficient accuracy.

The pressure sensitivity of crystals is well known. This characteristic may be used in the transducer of FIG. 3 to provide a force transducer. Assume that crystal holder electrodes 110 and 111 are fixed with respect to the force being sensed. The electrodes 112 and 113 are mechanically coupled to each other by an insulating member 114. This force to be measured is applied to shoulder portion 115. If this force is applied as indicated by arrow 116, the resonance point of crystal 101 will be raised and that of crystal 100 will be lowered. The resulting difference in frequency is detected in the manner previously described. The sensitivity of this device is double that of a single crystal configuration since the force on shoulder 115 lowers one crystal frequency and raises the other.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Means for converting a variable into a digital value comprising:
   a transducer having a resonant frequency dependent on the variable to be measured,
   means for shock exciting said transducer to induce oscillations at said resonant frequency,
   counter means,
   and control means connected to said transducer to operate said counter for the time occupied by a predetermined number of cycles of said transducer oscillations.

2. Means for converting a variable into a digital value comprising:
   a transducer having a resonant frequency dependent on the variable to be measured,
   means for shock exciting said transducer to induce oscillations at said resonant frequency,
   a source of pulses having a repetition frequency substantially higher than said transducer resonant frequency,
   pulse counter means having an input terminal and control terminals, means connecting said pulse source to said input terminal, oscillation counter means connected to said transducer and providing output signals at first and second counts of said induced oscillations, and means connecting said output signals to said control terminals to start operation of said pulse counter at said first count and terminate operation of said pulse counter at said second count.

3. A device for converting a variable into a digital value comprising:

a resonant transducer having a reactive component responsive to the variable being converted, means for shock exciting said transducer to induce oscillations having a frequency dependent on said variable, first counter means, a clock pulse generator providing pulses at a repetition frequency substantially higher than the frequency of said transducer, means connecting said generator to said first counter, and control means for said first counter, said control means including second counter means connected to said transducer to count said oscillations and operate said first counter in the time interval between a first predetermined count in said second counter and a second predetermined count in said second counter, to provide a value in said first counter representative of the period of said resonant circuit.

4. A device according to claim 3 wherein:

said transducer reactive component changes reactance in response to changes in the variable being converted, said means for shock exciting is electrical and the oscillations have a nominal frequency $f_1$ within a range between $f_{min}$ and $f_{max}$ dependent upon said variable, and said clock pulse generator supplies pulses at a repetition frequency $f_2$ at least four times higher than the nominal frequency of said resonant circuit.

5. A transducer for converting a variable into a digital value comprising:

an LC resonant circuit having a variable sensitive capacitance operative to change the resonant frequency of said circuit in response to changes in the variable being converted, means for shock exciting said resonant circuit to induce oscillations having a frequency dependent on said variable, first counter means, a clock pulse generator connected to supply pulses to said first counter at a frequency substantially higher than the frequency of said resonant circuit, control means for starting and stopping said first counter, second counter means connected to said resonant circuit to count said oscillations, means connecting said second counter means to said control means to start said first counter at a predetermined count in said second counter and to stop said first counter at a second predetermined count in said second counter, to provide a value in said first counter representative of the period of said resonant circuit.

6. In a variable measuring system, a reactive element having a value dependent on the variable to be measured, means connecting said element as a part of a resonant circuit to make the resonant frequency thereof at least partially dependent on the variable to be measured, means for shock exciting said circuit with a pulse to induce oscillations therein, and means connected to said circuit for determining the frequency of said oscillations.

7. In a variable measuring system, a reactive element having a value dependent on the variable to be measured, means connecting said element as a part of a resonant circuit to make the resonant frequency thereof at least partially dependent on the variable to be measured, means for shock exciting said circuit with a pulse having an effective duration of an integral number of odd half cycles of the nominal resonant frequency of said resonant circuit to induce oscillations therein, and timing means connected to said circuit for determining the period of said oscillations.

8. A device according to claim 7 wherein:

said integral number of half cycles is at least three.

9. A temperature measuring device comprising:

an LC resonant circuit having a temperature sensitive capacitor operative to change the resonant frequency of said circuit in response to changes in temperature, means for shock exciting said circuit to induce oscillations at said resonant frequency, and timing means connected to said circuit for determining the period of a fixed number of cycles of said oscillations.

10. A temperature measuring device comprising:

an LC resonant circuit having a temperature sensitive capacitor operative to change the resonant frequency of said circuit in response to changes in temperature, means for shock exciting said circuit to induce oscillations at said resonant frequency, counter means, and control means connected to said resonant circuit to operate said counter for the time occupied by a predetermined number of cycles of said oscillations.

11. Means for converting a variable into a digital value comprising:

a transducer having first and second resonant elements having first and second resonant frequencies, respectively, said resonant frequency of at least one of said elements being responsive to the variable, means for shock exciting said elements to induce oscillations at said first and second frequencies, detector means connected to said elements for providing an output signal having a frequency representing the difference between said first and second frequencies, a source of pulse signals having a repetition frequency substantially higher than the frequency of said output signal, counter means, and control means responsive to said output signal to operate said counter to count said pulse signals for a period of time occupied by a predetermined number of cycles of said output signal.

12. Means for converting a variable into a digital value comprising:

a transducer having first and second resonant elements having first and second resonant frequencies, respectively, said resonant frequency of said first element increasing in response to increases in the value of said variable, said resonant frequency of said second element decreasing in response to increases in the value of said variable, means for shock exciting said elements to induce oscillations at said first and second frequencies, detector means connected to said elements for providing an output signal having a frequency representing the difference between said first and second frequencies, a source of pulse signals having a repetition frequency substantially higher than the frequency of said output signal, counter means, and control means responsive to said output signal to operate said counter to count said pulse signals for a period of time occupied by a predetermined number of cycles of said output signal.

13. Means for converting a pressure variable into a digital value comprising:

a transducer having first and second crystals having first and second resonant frequencies, respectively, support means for clamping said crystals, means responsive to said pressure variable for changing the pressure exerted on at least one of said crystals by said support means, means for shock exciting said crystals to induce oscillations at said first and second frequencies, detector means connected to said crystals for providing an output signal having a frequency representing the difference between said first and second frequencies, a source of pulse signals having a repetition frequency substantially higher than the frequency of said output signal, counter means, and control means responsive to said output signal to operate said counter to count said pulse signals for a period of time occupied by a predetermined number of cycles of said output signal.

14. Means for converting a pressure variable into a digital value comprising:

a transducer having first and second crystals having first and second resonant frequencies, respectively, support means for exerting first and second preset pressures on said first and second crystals, respectively, means responsive to said pressure variable for increasing said first preset pressure and decreasing said second preset pressure in response to an increase in said pressure variable and for decreasing said first preset pressure and increasing said second preset pressure in response to a decrease in said pressure variable, means for shock exciting said crystals to induce oscillations at said first and second frequencies, detector means connected to said crystals for providing an output signal having a frequency representing the difference between said first and second frequencies, a source of pulse signals having a repetition frequency substantially higher than the frequency of said output signal, counter means, and control means responsive to said output signal to operate said counter to count said pulse signals for a period of time occupied by a predetermined number of cycles of said output signal.

References Cited by the Examiner
UNITED STATES PATENTS

| | | | |
|---|---|---|---|
| 2,713,639 | 7/1955 | Blackman | 331—166 |
| 2,851,877 | 9/1958 | Joy | 310—8.7 X |

References Cited by the Applicant
UNITED STATES PATENTS

| | | |
|---|---|---|
| 2,774,870 | 12/1956 | Rutishauser. |
| 2,817,019 | 12/1957 | Creveling. |
| 3,019,397 | 1/1962 | Cosby. |
| 3,164,993 | 1/1965 | Schmidt. |

ROY LAKE, *Primary Examiner.*

S. H. GRIMM, *Assistant Examiner.*